(12) United States Patent  (10) Patent No.: US 8,553,183 B2
Kim et al.  (45) Date of Patent: Oct. 8, 2013

(54) DISPLAY DEVICE HAVING REDUCED STEP COVERAGE AT OVERLAPPING PORTION OF COLOR FILTERS

(75) Inventors: Dong-Gyu Kim, Yongin-si (KR); Seong-Young Lee, Anyang-si (KR)

(73) Assignee: Samsung Display Co., Ltd. (KR)

( * ) Notice: Subject to any disclaimer, the term of this patent is extended or adjusted under 35 U.S.C. 154(b) by 1094 days.

(21) Appl. No.: 12/243,493

(22) Filed: Oct. 1, 2008

(65) Prior Publication Data

US 2009/0225017 A1  Sep. 10, 2009

(30) Foreign Application Priority Data

Mar. 7, 2008 (KR) .................. 10-2008-0021668

(51) Int. Cl.
 G02F 1/1333 (2006.01)
 G02F 1/1335 (2006.01)
 G02F 1/136 (2006.01)
(52) U.S. Cl.
 USPC ............. 349/110; 349/46; 349/106; 349/111
(58) Field of Classification Search
 USPC ..................... 349/108, 46, 106, 110–111
 See application file for complete search history.

(56) References Cited

U.S. PATENT DOCUMENTS

| 6,219,118 | B1 * | 4/2001 | Zhang ........................ 349/110 |
| 6,259,493 | B1 * | 7/2001 | Nakamura et al. ............ 349/38 |
| 7,242,452 | B2 | 7/2007 | Jeong et al. |
| 7,253,856 | B2 | 8/2007 | Kim et al. |
| 2004/0021816 | A1 * | 2/2004 | Jeong et al. ................. 349/117 |
| 2005/0253984 | A1 * | 11/2005 | Kim et al. ................... 349/106 |
| 2005/0270445 | A1 * | 12/2005 | Lee et al. ................... 349/108 |

FOREIGN PATENT DOCUMENTS

| JP | 2000-267130 | 9/2000 |
| JP | 2001-033820 | 2/2001 |
| JP | 2002-055361 | 2/2002 |
| JP | 2002-277888 | 9/2002 |
| KR | 2005-000129 | 1/2005 |
| KR | 2005-047753 | 5/2005 |
| KR | 2005-0079786 | 8/2005 |
| KR | 2006-128078 | 12/2006 |
| KR | 2006-129808 | 12/2006 |
| KR | 2007-057388 | 6/2007 |

* cited by examiner

*Primary Examiner* — Nathanael R Briggs

(74) *Attorney, Agent, or Firm* — Cantor Colburn LLP

(57) ABSTRACT

A display device includes; a first substrate, a first pixel electrode disposed on the first substrate, a second pixel electrode disposed on the first substrate and neighboring the first pixel electrode, a first color filter disposed under the first pixel electrode, a second color filter disposed under the second pixel electrode and overlapping the first color filter in an area between the first pixel electrode and the second pixel electrode, and a data line including a first portion and a second portion respectively disposed on left and right sides of the area wherein the first and second color filters overlap.

19 Claims, 7 Drawing Sheets

DISPLAY DEVICE HAVING REDUCED STEP COVERAGE AT OVERLAPPING PORTION OF COLOR FILTERS

This application claims priority to Korean Patent Application No. 10-2008-0021668, filed on Mar. 7, 2008, and all the benefits accruing therefrom under 35 U.S.C. §119, the contents of which in its entirety are herein incorporated by reference.

BACKGROUND OF THE INVENTION (a) Field of the Invention

The present invention relates to a display device.

(b) Description of the Related Art

Liquid crystal displays ("LCDs") are one of the most widely used flat panel displays. An LCD typically includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines orientations of LC molecules therein to adjust polarization of incident light, and thereby adjust transmission of light through the display.

In some types of LCDs, a structure in which the field generating electrodes are respectively provided to two display panels is widely used. In such LCDs, one display panel includes a plurality of thin film transistors ("TFTs") and pixel electrodes arranged in a matrix shape, and the other panel includes color filters, a light-blocking member and a common electrode covering the whole surface thereof.

However, in such LCDs the pixel electrodes and color filters are respectively formed on different display panels in the LCD such that it is difficult to correctly align the pixel electrodes and color filters, and as a result an alignment error may be generated.

To solve this problem, a color filter on array ("CoA") structure in which the pixel electrodes and the color filters are formed on the same display panel has been developed. In the color filter on array structure, the color filters, the pixel electrodes, and a plurality of signal lines, such as gate lines and data lines for applying voltages to the pixel electrodes and switching elements for controlling them, are generally formed on one display panel.

Generally, color filters disposed in neighboring pixels are partially overlapped with each other near the boundary thereof. However, in the case of the color filter on array structure, the signal lines such as the data lines are disposed near the boundary of the pixels such that the color filters are overlapped on the signal lines.

In this case, step coverage is increased due to the sum of the thickness of the signal line and the increased thickness of the overlapping color filters near the boundary of the pixels. Accordingly, the interval between the display panel having the color filters and the facing display panel is narrow near the boundary of adjacent pixels such that the cell gap becomes non-uniform throughout the display device. The non-uniform cell gap may lead to defects in the resulting display.

BRIEF SUMMARY OF THE INVENTION

The present invention increases uniformity of cell gap by reducing step coverage at an overlapping portion of color filters in a liquid crystal display having a color filter on array structure.

An exemplary embodiment of a display device according to the present invention includes; a first substrate, a first pixel electrode disposed on the first substrate, a second pixel electrode disposed on the first substrate and neighboring the first pixel electrode, a first color filter disposed under the first pixel electrode, a second color filter disposed under the second pixel electrode and overlapping the first color filter in an area between the first pixel electrode and the second pixel electrode, and a data line including a first portion and a second portion respectively disposed on left and right sides of the area wherein the first and second color filters overlap.

In one exemplary embodiment, the first portion of the data line may overlap the first pixel electrode, and the second portion may overlap the second pixel electrode.

In one exemplary embodiment, the entire width of the first portion of the data line may overlap the first pixel electrode, and the entire width of the second portion may overlap the second pixel electrode.

In one exemplary embodiment, the first portion and the second portion of the data line may be alternately disposed.

In one exemplary embodiment, the area of the first portion of the data line overlapping the first pixel electrode may be substantially the same area as that of the second portion of the data line overlapping the second pixel electrode.

In one exemplary embodiment, the first portion and the second portion of the data line may extend in a first direction, and the data line may further include a third portion connecting the first portion and the second portion.

In one exemplary embodiment, the display device may further include; a first light-blocking member overlapping at least one of an edge of the first pixel electrode and the second pixel electrode, and being disposed substantially parallel to one of the first portion and the second portion of the data line.

In one exemplary embodiment, the first light-blocking member may be disposed substantially opposite to one of the first portion of the data line and the second portion of the data line with respect to the area wherein the first and second color filter layers overlap, respectively.

In one exemplary embodiment, the display device may further include; a semiconductor disposed under the data line and having substantially the same planar shape as the data line, and a second light-blocking member disposed under the semiconductor.

In one exemplary embodiment, the display device may further include; a second substrate disposed facing the first substrate, a third light-blocking member disposed on the second substrate, a common electrode disposed on the third light-blocking member, and a liquid crystal layer disposed between the first substrate and the second substrate, wherein the width of the third light-blocking member is equal to or larger than the sum of a width of the data line, an interval between the first pixel electrode and the second pixel electrode, and a width corresponding to an area of overlap between the first light-blocking member and one of the first pixel electrode and the second pixel electrode.

Another exemplary embodiment of a display device according to the present invention includes; a first substrate, a first pixel electrode disposed on the first substrate, a second pixel electrode disposed on the first substrate and neighboring the first pixel electrode, and a data line including a first portion and a second portion respectively disposed on opposite sides of the first and second pixel electrodes with respect to an imaginary straight line passing between the first pixel electrode and the second pixel electrode, and a third portion connecting the first and second portions to each other, wherein the entire width of the first portion of the data line overlaps the first pixel electrode, and the entire width of the second portion of the data line overlaps the second pixel electrode.

In one exemplary embodiment, the display device may further include; a first color filter disposed under the first pixel electrode, and a second color filter disposed under the second pixel electrode, wherein the first color filter and the second color filter overlap each other in an area between the first pixel electrode and the second pixel electrode.

In one exemplary embodiment, the first portion and the second portion of the data line may be disposed away from the area wherein the first color filter and the second color filter overlap.

In one exemplary embodiment, the first portion of the data line may be disposed between two second portions of the data lines.

In one exemplary embodiment, the areas of the first portion and the second portion of the data line may be substantially the same.

In one exemplary embodiment, the display device may further include; a first light-blocking member partially overlapping an edge of one of the first and second pixel electrode and disposed substantially parallel to one of the first and second portions of the data line.

In one exemplary embodiment, the first light-blocking member may include portions disposed substantially opposite to the first and second portion of the data line with respect to the area wherein the first color filter and the second color filter overlap.

In one exemplary embodiment, the display device may further include a semiconductor disposed under the data line and having substantially the same planar shape as the data line, and a second light-blocking member disposed under the semiconductor.

In one exemplary embodiment, the display device may further include; a second substrate disposed facing the first substrate, a third light-blocking member disposed on the second substrate, a common electrode disposed on the third light-blocking member, and a liquid crystal layer interposed between the first substrate and the second substrate, wherein the width of the third light-blocking member may be substantially equal to or larger than a sum of a width of the data line, an interval between the first pixel electrode and the second pixel electrode and a width corresponding to an area of overlap between the first light-blocking member, and one of the first pixel electrode and the second pixel electrode.

Accordingly, the data lines are formed away from the overlapping portions of the color filter such that the increasing of the step coverage of the overlapping portions of the color filter may be prevented, thereby forming a uniform cell gap. The data line and the light-blocking member may prevent light leakage that is generated by an inclination formed by the overlapping portions of the neighboring color filters. In addition, in one exemplary embodiment, the pixel electrode completely covers the width of the data line such that non-uniformity of parasitic capacitance of pixels may be prevented.

DETAILED DESCRIPTION OF THE INVENTION

Figure 1:
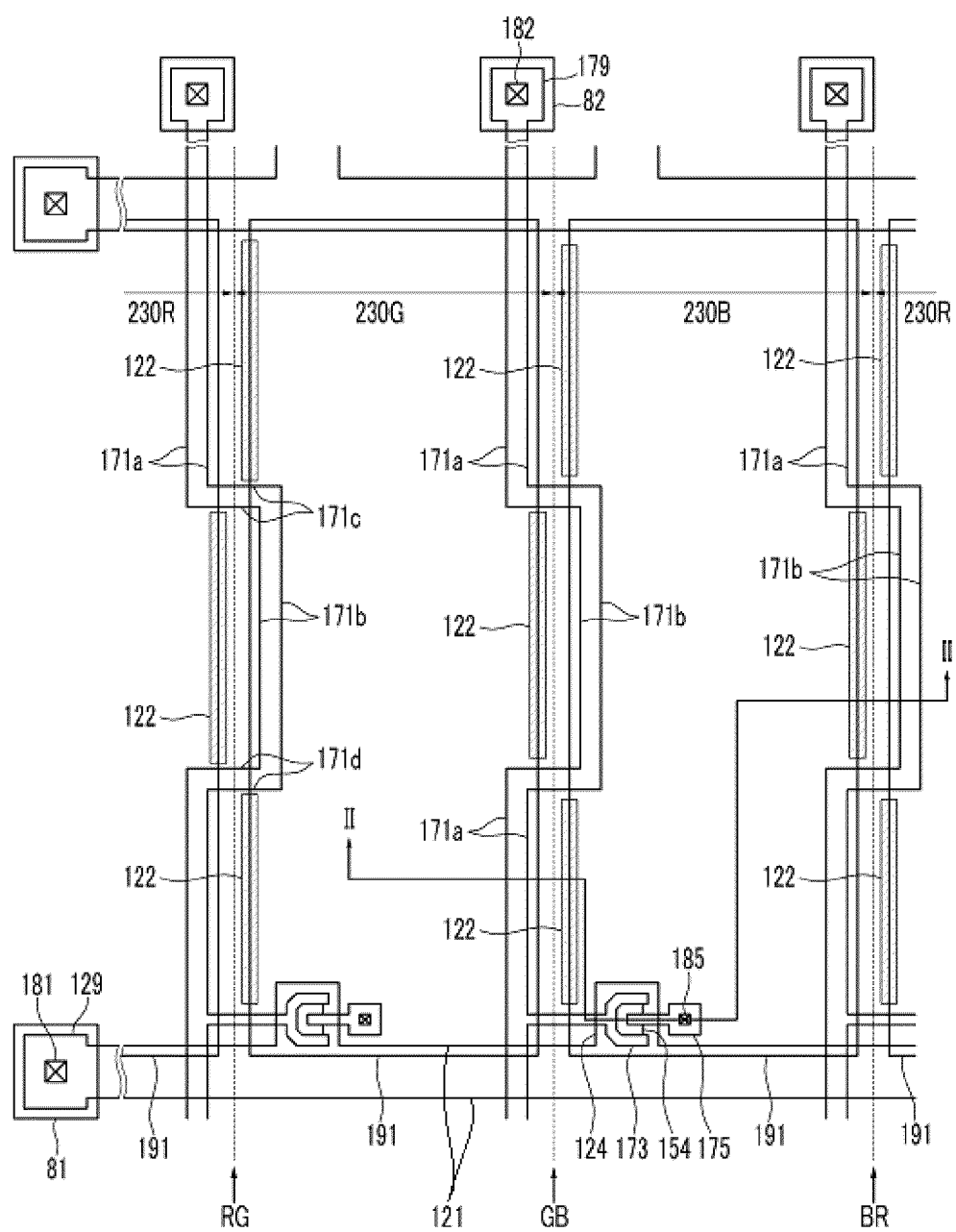
FIG. 1 is a top plan layout view illustrating an exemplary embodiment of two neighboring pixels in an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Exemplary Embodiment 1

Firstly, an exemplary embodiment of a liquid crystal display ("LCD") according to the present invention will be described with the reference to FIG. 1 and FIG. 2.

Figure 2:
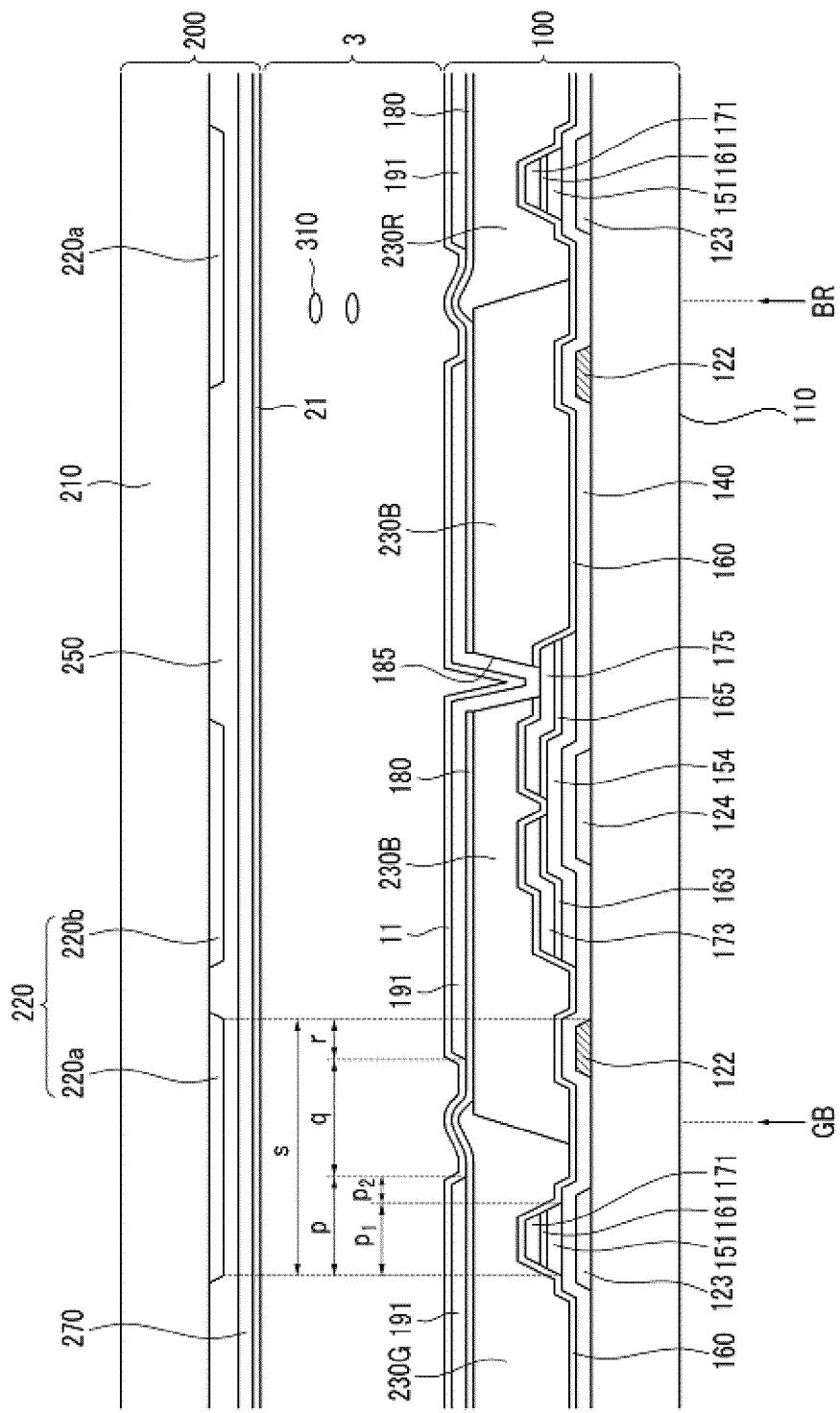
FIG. 2 is a cross-sectional view of the exemplary embodiment of an LCD of FIG. 1 taken along line II-II.

FIG. 1 is a top plan layout view illustrating an exemplary embodiment of two neighboring pixels in an exemplary embodiment of an LCD according to the present invention, and FIG. 2 is a cross-sectional view of the exemplary embodiment of an LCD of FIG. 1 taken along line II-II.

Referring to FIG. 1 and FIG. 2, the exemplary embodiment of an LCD according to the present invention includes a thin film transistor ("TFT") array panel 100, a common electrode panel 200 facing the thin film transistor array panel 100 and a liquid crystal layer 3 interposed between the thin film transistor array panel 100 and the common electrode panel 200.

Hereinafter, the TFT array panel 100 will be described. A gate conductor including a plurality of gate lines 121, a plurality of first light-blocking members 122, and a plurality of second light-blocking members 123 are formed on an insulation substrate 110. The gate lines 121 transmit gate signals and extend across the insulation substrate 110 in a substantially transverse, or horizontal/lateral, direction. Each of the gate lines 121 includes a plurality of gate electrodes 124 protruding from the gate lines 121, and an end portion 129 having a large area for contact with another layer or an external driving circuit. In one exemplary embodiment, the gate electrodes 124 protrude in an upward, or vertical/longitudinal, direction. Alternative exemplary embodiments also include configurations wherein the end portion 129 is omitted, and/or the gate lines 121 are connected directly to another layer or an external driving circuit.

The first light-blocking members 122 are separated from the gate lines 121 and have a bar shape extending in a substantially vertical/longitudinal direction. In the present exemplary embodiment, the first light-blocking members 122, disposed between two neighboring gate lines 121, are arranged in a row direction with a predetermined interval therebetween. In another exemplary embodiment, the first light-blocking members 122 are arranged in a column direction.

In the present exemplary embodiment, the second light-blocking members 123 are separated from the gate lines 121 and the first light-blocking members 122 and are extended in a substantially bar shape in the substantially vertical/longitudinal direction. In one exemplary embodiment, the second light-blocking members 123 are disposed neighboring the first light-blocking members 122.

In the present exemplary embodiment, the first light-blocking members 122 and the second light-blocking members 123 are not directly connected to any of the signal lines, but are instead allowed to maintain a floating voltage.

In the present exemplary embodiment, a gate insulating layer 140, exemplary embodiments of which may be made of silicon nitride ($SiN_x$) or silicon dioxide ($SiO_2$) may be formed on the gate conductor.

A plurality of semiconductor stripes 151, exemplary embodiments of which may be made of hydrogenated amorphous silicon (hereinafter referred to as "a-Si:H") or polysilicon, is formed on the gate insulating layer 140. The semiconductor stripes 151 extend in the substantially vertical/longitudinal direction and change direction at least two times, in one exemplary embodiment the changes in direction result in a U-shaped bend as shown in FIG. 1. In the present exemplary embodiment, each semiconductor stripe 151 includes a plurality of protrusions 154 extending toward the gate electrodes 124.

A plurality of ohmic contact stripes 161 and ohmic contact islands 165 are formed on the semiconductor stripes 151. The ohmic contact stripes 161 include a plurality of protrusions 163 extended toward the protrusions 154, and the protrusions 163 and the ohmic contact islands 165 form a pair and are disposed on the protrusions 154. In one exemplary embodiment, the ohmic contact stripes 161 and ohmic contact islands 165 may be made of n+ hydrogenated a-Si heavily doped with an N-type impurity, exemplary embodiments of which may include phosphorous, or, in an alternative exemplary embodiment, they may be made of silicide.

A plurality of data lines 171 and a plurality of drain electrodes 175 are formed on the ohmic contacts 161 and 165. The data lines 171 transmit data voltages and substantially extend in the substantially longitudinal direction, thereby intersecting the gate lines 121. However, each data line 171 is not necessarily disposed in a straight line, and in one exemplary embodiment one line may change direction at least twice. As shown in FIG. 1, each data line 171 may include a first longitudinal portion 171a extended in the substantially longitudinal direction, a first transverse portion 171c that extends from the first longitudinal portion 171a to the right and extends in the substantially transverse/horizontal direction, a second longitudinal portion 171b that extends downward from the first transverse portion 171c and extends in the substantially longitudinal direction and a second transverse portion 171d that extends from the second longitudinal portion 171b to the left and extends in the substantially transverse direction. The first longitudinal portion 171a, the first transverse portion 171c, the second longitudinal portion 171b, and the second transverse portion 171d arrangement may be repeated several times to form an individual data line 171. However, the shape of the data lines 171 and the number of the curved portions may be changed as would be apparent to one of ordinary skill in the art. In one exemplary embodiment, the shape of the data lines 171 substantially matches the shape of the semiconductor stripe 151.

The first light-blocking members 122 are disposed substantially parallel to the first longitudinal portion 171a and the second longitudinal portion 171b of the data lines 171. In the present exemplary embodiment, the first light-blocking members 122 are formed in the same layer as the gate lines 121, however alternative exemplary embodiments include configurations wherein the first light-blocking members 122 may be formed in the same layer as the data lines 171.

In the present exemplary embodiment, each of the data lines 171 includes a plurality of source electrodes 173 extended toward the gate electrodes 124 and an end portion 179 having a large area for connecting to other layers or an external driving circuit. Alternative exemplary embodiments include configurations wherein the end portions 179 are omitted, similar to alternative exemplary embodiment of the gate lines 129 as discussed above.

The drain electrodes 175 are respectively separated from the data lines 171, and face the source electrodes 173 with respect to the gate electrodes 124. In the present exemplary embodiment, each of the drain electrodes 175 includes one end portion having a wide area, and the other end portion having a bar shape. The bar end portion is partially enclosed by the curved source electrode 173.

A gate electrode 124, a source electrode 173, a drain electrode 175 and the protrusion 154 of the semiconductor stripe 151 form a TFT Q, wherein the channel of the TFT is formed on the protrusion 154 of the semiconductor stripe 151 between the source electrode 173 and the drain electrode 175.

As discussed above, in one exemplary embodiment, the semiconductor stripes 151 have substantially the same plane shape as the data lines 171 and the drain electrodes 175, except for the protrusions 154 where the TFTs are disposed.

In the present exemplary embodiment, the ohmic contact stripes 161 are interposed between the semiconductor stripes 151 and the data lines 171, and have substantially the same plane shape as the data lines 171. Similarly, in the present exemplary embodiment, the ohmic contact islands 165 are interposed between the protrusions 154 of the semiconductor stripes 151 and the drain electrodes 175, and have substantially the same plane shape as the drain electrodes 175.

In the present exemplary embodiment, the second light-blocking members 123 are positioned under the semiconductor stripes 151, and are disposed corresponding to the data lines 171 and the semiconductor stripes 151. The second light-blocking members 123 are located under the semiconductor stripes 151 such that light emitted from a light source such as a backlight may be prevented from flowing to the semiconductor stripes 151.

A sealing layer 160, exemplary embodiments of which may be made of a silicon nitride or silicon dioxide, may be formed on the data lines 171 and the drain electrodes 175. The sealing layer 160 may prevent pigments of a color filter 230, as will be described later, from inflowing to the protrusions 154 of the semiconductor stripes 151 exposed between the source electrodes 173 and the drain electrodes 175.

A plurality of color filters 230 is formed on the sealing layer 160. In the present exemplary embodiment, the color filters 230 include three primary color filters, exemplary embodiments of which include a red filter 230R, a green filter 230G and a blue filter 230B. For convenience of description, the exemplary embodiments of the present invention are discussed as including the red filter 230R, the green filter 230G, and the blue filter 230B, however, alternative exemplary embodiments include configurations wherein a color filter having a different color may be included and an insulating layer in which a color is not represented may be formed as a substitute for the color filter.

The red filter 230R, the green filter 230G, and the blue filter 230B are arranged with the stripe shape in the vertical/longitudinal direction. Also, the red filter 230R, the green filter 230G, and the blue filter 230B may be alternately arranged in a row or column direction such that adjacent pixels in the row or column direction have differently colored color filters 230.

In the present exemplary embodiment, both edges of the color filters 230 overlap the neighboring color filters 230, and for example, one edge of the blue filter 230B overlaps the neighboring green filter 230G and the other edge thereof overlaps the neighboring red filter 230R. As used here, overlap may refer to situations wherein the color filter 230 is disposed over another color filter 230 or wherein the color filter 230 is disposed beneath another color filter 230, e.g., an underlapping arrangement.

Here, a portion where the color filters are overlapped with each other has the higher step coverage than other portions, and portions where the red filter 230R and the green filter 230G are overlapped, the green filter 230G and the blue filter 230B are overlapped, and the blue filter 230B and the red filter 230R are overlapped, are respectively indicated by "RG", "GB", and "BR" in the various figures.

The first and second longitudinal portions 171a and 171b of the data lines 171 are located so they do not underlie the overlapping portions RG, GB, and BR. That is, the first and second longitudinal portions 171a and 171b of the data lines 171 are respectively disposed on the left and right sides of the overlapping portions RG, GB, and BR of the color filter. However, alternative exemplary embodiments include configurations wherein the left and right sides may be exchanged.

The first light-blocking members 122 may be disposed substantially opposite to the first longitudinal portion 171a of the data line 171 or the second longitudinal portion 171b of the data line 171 with respect to the overlapping portions RG, GB, and BR of the color filter.

In the present exemplary embodiment, a passivation layer 180 is formed on the color filters 230. Exemplary embodiments of the passivation layer 180 may be made of an inorganic insulating material, exemplary embodiments of which include a silicon nitride or silicon dioxide. The passivation layer 180 prevents the color filter 230 from being lifted off of the sealing layer 160 during subsequent processing, and it may also prevent a chemical solution such as an etchant from flowing into the color filter 230 in subsequent processing.

The passivation layer 180, the color filters 230, and the sealing layer 160 have a plurality of contact holes 185 and 182 respectively exposing the drain electrodes 175 and the end portions 179 of the data lines. The passivation layer 180, the sealing layer 160, and the gate insulating layer 140 have a plurality of contact holes 181 respectively exposing the end portions 129 of the gate lines 121.

In one exemplary embodiment, a plurality of pixel electrodes 191 and a plurality of contact assistants 81 and 82 are formed on the passivation layer 180. The pixel electrodes 191 are connected to the drain electrodes 175 through the contact holes 185, and receive data voltages from the drain electrodes 175.

In the present exemplary embodiment, each of pixel electrodes 191 has a substantially rectangular shape, and overlaps a portion of the gate lines 121 and data lines 171 in a region defined by two gate lines 121 and two data lines 171.

In the present exemplary embodiment, the pixel electrodes 191 asymmetrically overlap the data lines 171 disposed on both sides thereof. As an example, one side of a pixel electrode 191 overlaps the first longitudinal portion 171a of the data line 171 and the other side of the pixel electrode 191 overlaps the second longitudinal portion 171b of the data line 171. In the present exemplary embodiment, the pixel electrode 191 completely overlaps the width of the first and second longitudinal portions 171a and 171b of the data line 171.

In the present exemplary embodiment, the first and second longitudinal portions 171a and 171b of the data lines 171 are not located under the overlapping portions RG, GB, and BR of the color filters, but are located on the right and left sides of the overlapping portions RG, GB, and BR of the color filters. Accordingly, the data lines 171 are located away from the overlapping portions RG, GB, and BR of the color filters such that the increasing of the step coverage of the overlapping portions of the color filter may be prevented, thereby forming a uniform cell gap. The first transverse portion 171c of the data lines 171 is relatively short when compared with the rest of the data line 171, and its location underneath the overlapping portions RG, GB and BR of the color filters does not significantly affect the step coverage of the overlapping portions of the color filters or degrade display quality.

When the data lines 171 exist under the overlapping portions RG, GB, and BR of the color filters, the step coverage of the thickness formed by the overlapping of the neighboring color filters is increased by the thickness of the data lines 171, the semiconductor stripes 151, and the ohmic contacts 161 such that the cell gap between the pixel electrodes 191 and the common electrode panel 200 near the two neighboring pixels is relatively narrow in comparison with the cell gap throughout the other areas of the display. When the cell gap near the two neighboring pixels is relatively narrow, the liquid crystal may not filled in that portion and a cleansing solution may be accumulated in that portion during subsequent processing steps, and thereby the display characteristic may be non-uniform.

In the present exemplary embodiment, the first and second longitudinal portions 171a and 171b are not positioned under the overlapping portions RG, GB, and BR of the color filter thereby forming a uniform cell gap.

Also, in the present exemplary embodiment, the first and second longitudinal portions 171a and 171b of the data line 171 disposed on the right and left sides of the overlapping portions RG, GB, and BR of the color filter overlap different pixel electrodes 191. That is, the first portion 171a of the data line 171 may be disposed on the side of the left pixel electrode 191 and the second portion 171b of the data line 171 may be disposed on the side of the right pixel electrode 191 with respect to an imaginary straight line passing between the two neighboring pixel electrodes 191, and the imaginary straight line may be an approximate central line of the overlapping portions of the color filter.

The first and second longitudinal portions 171a and 171b of the data line 171 may prevent light leakage generated by the inclination formed by the overlapping portions of the neighboring color filter by reducing, or effectively eliminating, the large step coverage due to overlapping color filters and signal lines.

In one exemplary embodiment, the area where the first longitudinal portion 171a of the data line 171 and the pixel electrode 191 overlap each other may be substantially the same as the area where the second longitudinal portion 171b of the data line 171 and the pixel electrode 191 overlap each other.

Also, in the present exemplary embodiment, the pixel electrode 191 completely covers the width of the first or second longitudinal portions 171a and 171b of the data line 171 such that the non-uniformity of a parasitic capacitance generated by the difference of the overlap between the data line 171 and the pixel electrode 191 in each pixel may be prevented.

The plurality of first light-blocking members 122 are formed on portions of the insulation substrate 110 where the first and second longitudinal portions 171a and 171b of the data lines 171 are not disposed near the edges of the pixel electrodes 191 such that light leakage generated by an inclination formed on the overlapping portion of the color filter may be reduced. In one exemplary embodiment, the first light-blocking members 122 partially overlap the edges of the pixel electrodes 191, and the portions that are not overlapped by the pixel electrode 191 may protrude from the ends of the pixel electrodes 191 by about 1 μm to about 5 μm. In one exemplary embodiment, the protrusion may be about 2 μm.

Next, the common electrode panel 200 will be described. A plurality of third light-blocking members 220 that are separated from each other by a predetermined interval, also called a black matrix, are formed on an insulation substrate 210. However, in an alternative exemplary embodiment, the third light-blocking members 220 may be formed on the TFT array panel 100.

The third light-blocking members 220 may include a linear portion 220a extended in the vertical/longitudinal direction and a protrusion 220b corresponding to the TFTs. In one exemplary embodiment, the linear portion 220a may have a width that completely covers the edges of two neighboring pixel electrodes 191.

Referring to FIG. 2, the width "s" of the linear portion 220a of the third light-blocking member 220 may be equal to the sum of the distance "p" from the end of the data line 171 overlapped by the pixel electrode 191 to the end of the pixel electrode 191, the interval "q" between the neighboring pixel electrodes 191, and the width "r" corresponding to an area of overlap between the first light-blocking member 122 and the pixel electrode 191. In another exemplary embodiment, the width "s" may be wider when considering the processing margins of the method of manufacturing the display. In the exemplary embodiment shown in FIG. 2, "p", the distance from the end of the data line 171 overlapped with the pixel electrode 191 to the end of the pixel electrode 191 includes a width "$p_1$" of the data line 171 and a process margin "$p_2$".

The third light-blocking member 220 may prevent the light leakage that is generated by an inclination formed in the overlapping portion of the color filter. An overcoat 250 and a common electrode 270 are formed on the third light-blocking member 220.

Alignment layers 11 and 21 are respectively formed on the inside surfaces of the TFT array panel 100 and the common electrode panel 200, and polarizers (not shown) are attached on the outside surfaces thereof.

A liquid crystal layer 3 including a plurality of liquid crystal molecules 310 is interposed between the thin film transistor array panel 100 and the common electrode panel 200. In one exemplary embodiment, the liquid crystal molecules 310 have positive dielectric anisotropy, and long axes of liquid crystal molecules 310 in the liquid crystal layer 3 may be parallel to the surfaces of the two display panels 100 and 200 in the absence of an electric field, and may be rearranged in a predetermined direction under the application of an electric field between the common electrode 270 and the pixel electrode 191.

Exemplary Embodiment 2

Next, a second exemplary embodiment of an LCD according to the present invention will be described with reference to drawings. Each pixel of the present exemplary embodiment includes a pair of sub-pixels, different from the above-described exemplary embodiment. Descriptions repeating the previous exemplary embodiment are omitted, and the same constituent elements are indicated by the same reference numerals.

Figure 3:
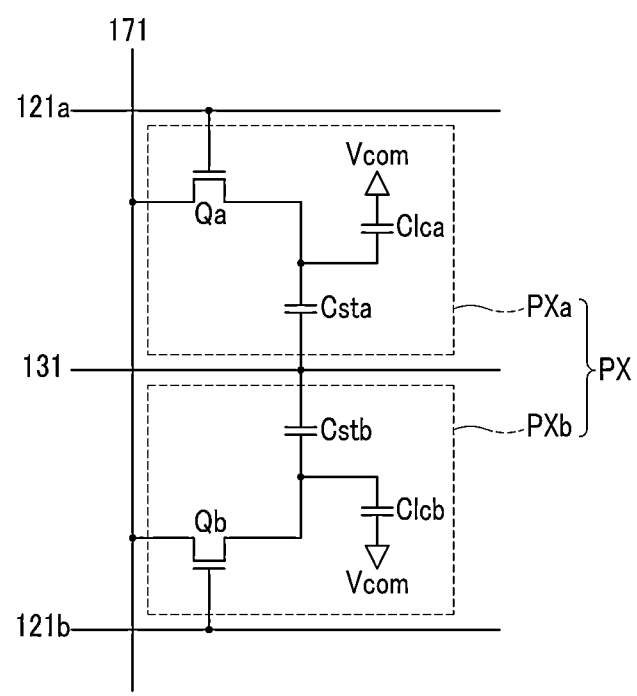
FIG. 3 is an equivalent circuit diagram of an exemplary embodiment of one pixel of an exemplary embodiment of an LCD according to the present invention.

FIG. 3 is an equivalent circuit diagram of an exemplary embodiment of one pixel of an exemplary embodiment of an LCD according the present invention.

Referring to FIG. 3, an exemplary embodiment of an LCD includes a plurality of signal lines having a plurality of pairs of gate lines 121a and 121b, a plurality of data lines 171, and a plurality of storage electrode lines 131, and a plurality of pixels PX connected thereto.

Each pixel PX has a pair of sub-pixels PXa and PXb. Each sub-pixel PXa/PXb has a switching element Qa/Qb connected to a corresponding gate line 121a/121b, respectively, and a data line 171, a liquid crystal capacitor Clca/Clcb connected to the switching element Qa/Qb, respectively, and a storage capacitor Csta/Cstb connected to the switching element Qa/Qb, respectively, and a storage electrode line 131.

Figure 4:
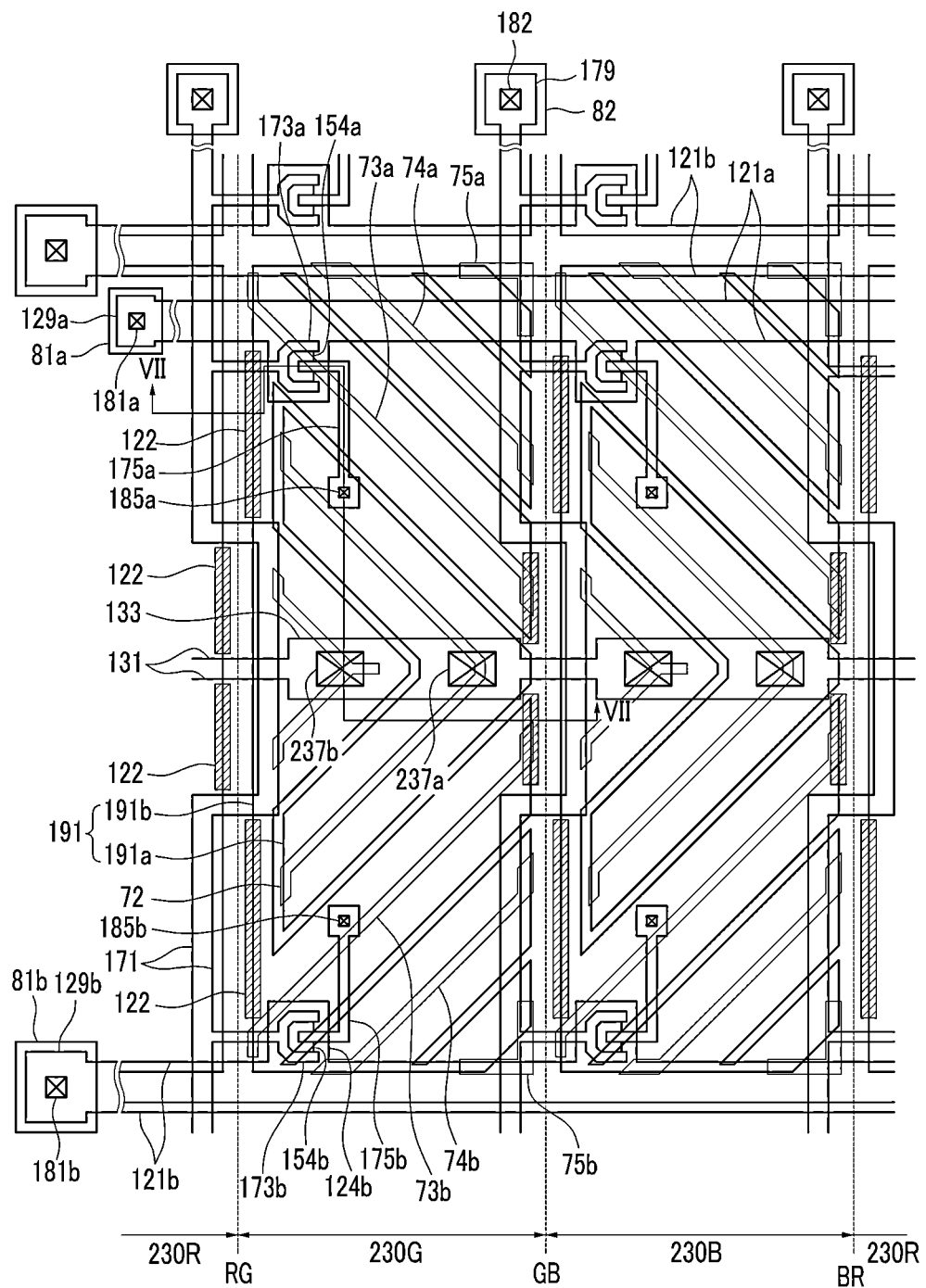
FIG. 4 is a top plan layout view of another exemplary embodiment of an LCD according to the present invention.
Figure 5:
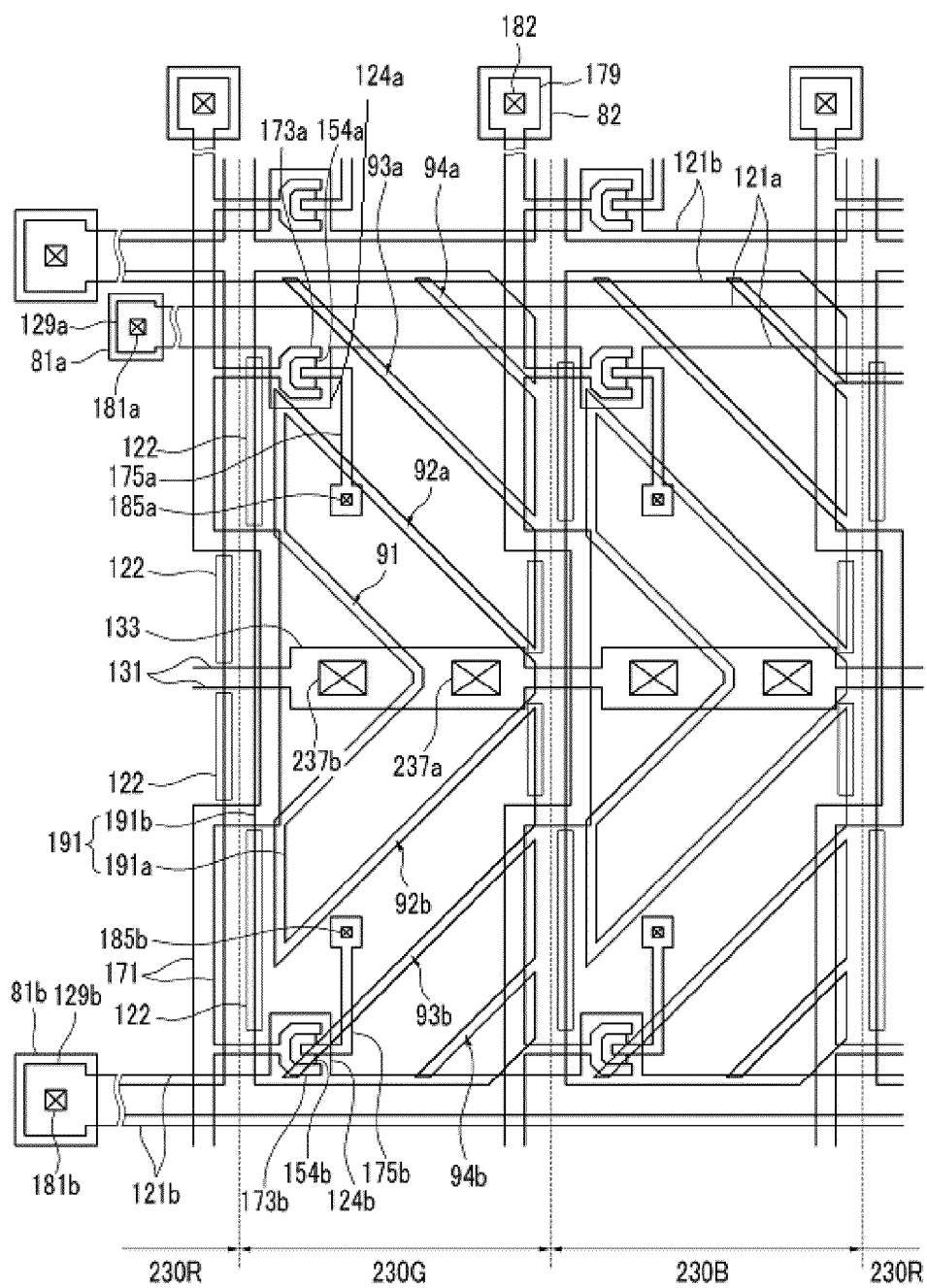
FIG. 5 is a top plan layout view of the exemplary embodiment of a thin film transistor ("TFT") array panel of the exemplary embodiment of an LCD shown in FIG. 4.
Figure 6:
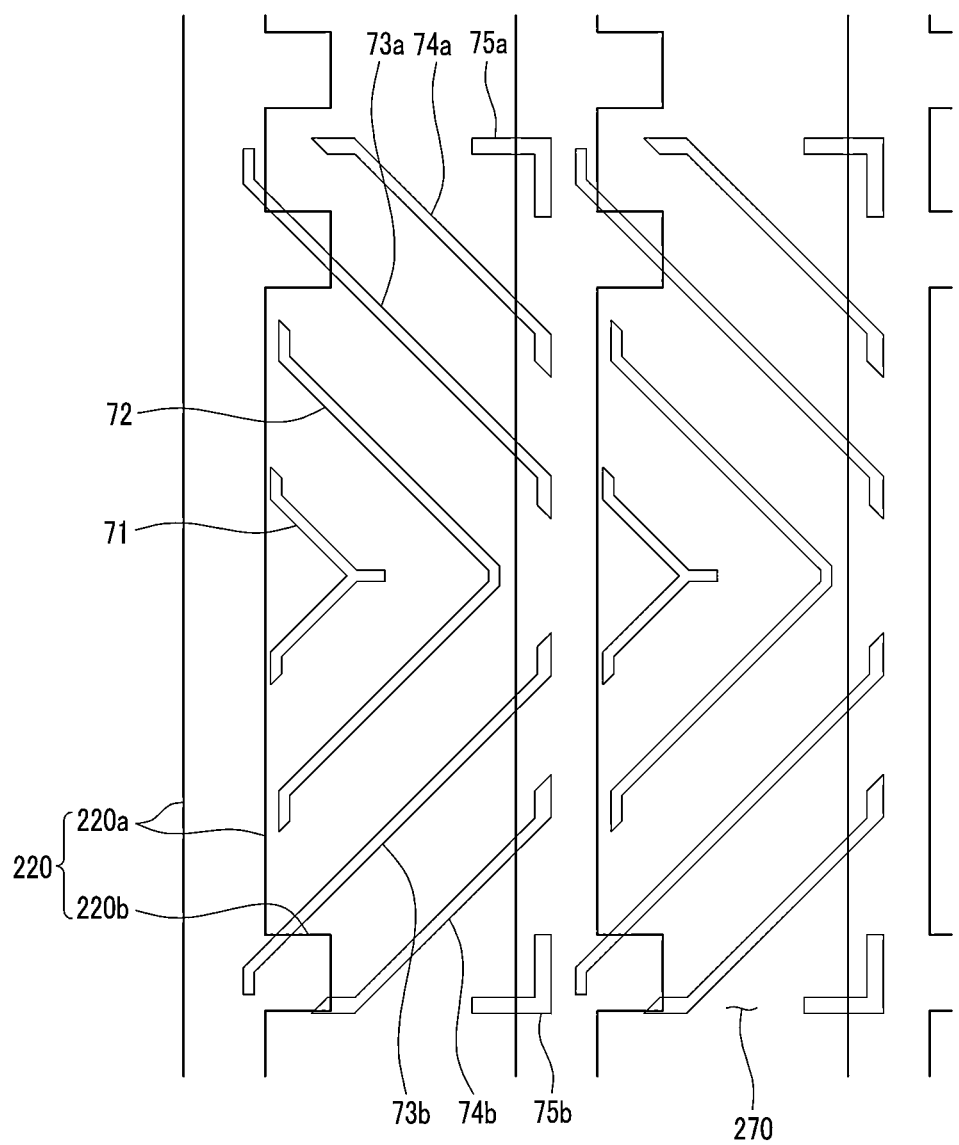
FIG. 6 is a top plan layout view of the exemplary embodiment of a common electrode panel of the exemplary embodiment of an LCD shown in FIG. 4.
Figure 7:
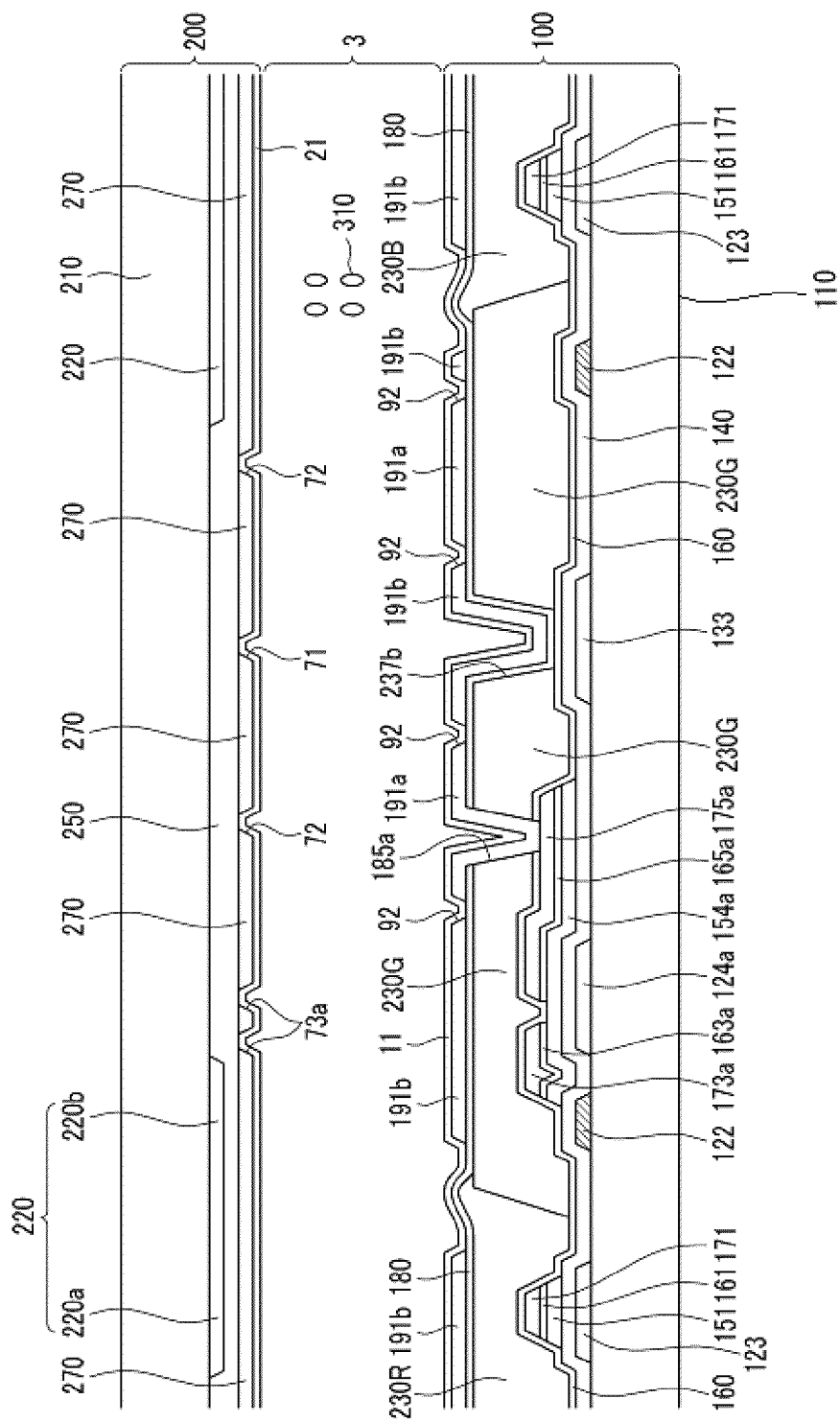
FIG. 7 is a cross-sectional view of the exemplary embodiment of an LCD shown in FIG. 4 taken along line VII-VII.

Referring to FIG. 4 to FIG. 7, an exemplary embodiment of the LCD shown in FIG. 3 is illustrated in detail. FIG. 4 is a top plan layout view of another exemplary embodiment of an LCD according to the present invention, FIG. 5 is a top plan layout view of the exemplary embodiment of a TFT array panel of the exemplary embodiment of an LCD shown in FIG. 4, FIG. 6 is a top plan layout view of the exemplary embodiment of a common electrode panel of the exemplary embodiment of an LCD shown in FIG. 4 and FIG. 7 is a cross-sectional view of the exemplary embodiment of an LCD shown in FIG. 4 taken along line VII-VII.

First, the TFT array panel 100 will be described. A gate conductor including a plurality of pairs of first and second gate lines 121a and 121b, a plurality of storage electrode lines 131, a plurality of first light-blocking members 122 and a plurality of second light-blocking members 123 are formed on an insulation substrate 110.

The first gate lines 121a include a plurality of first gate electrodes 124a that protrude downwardly in a longitudinal direction, and a wide end portion 129a for connection to a different layer or an external driving circuit. The second gate lines 121b include a plurality of second gate electrodes 124b that protrude upwardly in a longitudinal direction, and a wide end portion 129b for connection to a different layer or an external driving circuit. Alternative exemplary embodiments include configurations wherein the wide end portions 129a and/or 129b may be omitted.

The storage electrode lines 131 are applied with a predetermined voltage, such as the common voltage Vcom, and extend substantially in the transverse direction. Each of the storage electrode lines 131 is positioned between a first gate line 121a and a second gate line 121b and includes a plurality of storage electrodes 133 that extend upward and downward longitudinally from the storage electrode line 131. However, alternative exemplary embodiments include configurations wherein the shapes and arrangements of the storage electrodes 133 and the storage electrode lines 131 can be modified in various forms.

A gate insulating layer 140 is formed on the gate conductor, and a plurality of semiconductor stripes 151, including a plurality of protrusions 154a and 154b, a plurality of ohmic contact stripes 161, including a plurality of protrusions 163a and 163b, and a plurality of ohmic contact islands 165a and 165b are formed thereon.

A data conductor including a plurality of data lines 171 and a plurality of first and second drain electrodes 175a and 175b is formed on the ohmic contact stripes 161, the ohmic contact islands 165a and 165b and the gate insulating layer 140.

Each data line 171 is not disposed in a straight line and deviates from a longitudinal direction at least two times. Each data line 171 includes the first longitudinal portion, the first transverse portion, the second longitudinal portion, and the second transverse portion, which are repeated several times, as in the above-described exemplary embodiment.

Each of the data lines 171 includes a plurality of pairs of first and second source electrodes 173a and 173b that respectively extend toward the first and second gate electrodes 124a and 124b, and a wide end portion 179 for connection to a different layer or an external circuit. Alternative exemplary embodiments include configurations wherein the wide end portion 179 may be omitted.

The first and second drain electrodes 175a and 175b are separated from each other and are separated from the data lines 171. The first/second drain electrode 175a/175b faces the first/second source electrode 173a/173b with respect to the first/second gate electrode 124a/124b, respectively, and a portion of the bar-shaped end portion is partially enclosed by the deviated portion of the first/second source electrode 173a/173b.

The semiconductor stripes 151 have substantially the same plane shape as the data lines 171 and the drain electrodes 175, except for the protrusion 154 where the TFT is disposed.

Ohmic contact stripes 161 are interposed between the semiconductor stripes 151 and the data lines 171, and have substantially the same plane shape as the data lines 171. Ohmic contact islands 165 are interposed between the semiconductor stripes 151 and the drain electrodes 175, and have substantially the same plane shape as the drain electrodes 175.

A sealing layer 160 is formed on the data conductor, and a color filter 230 including red filters 230R, green filters 230G, and blue filters 230B is formed thereon. The color filter 230 has a plurality of openings 237a and 237b respectively exposing the sealing layer 160 on the storage electrode 133. The openings 237a and 237b decrease the thickness of the dielectric material forming the storage capacitance that is generated between the storage electrodes 133 and the pixel electrodes 191, thereby increasing the storage capacitance.

Both edges of the color filters 230 overlap the neighboring color filters 230, for example one edge of the blue filters 230B overlaps the neighboring green filters 230G and the other edge overlaps the neighboring red filters 230R. Here, the portions where the color filters overlap each other have higher step coverage than other portions thereof, and portions where the red filter 230R and the green filter 230G are overlapped, the green filter 230G and the blue filter 230B are overlapped, and the blue filter 230B and the red filter 230R are overlapped are respectively indicated by "RG", "GB", and "BR" in the drawings.

The overlapping portions RG, GB, and BR of the color filters are not overlapped with the first and second longitudinal portions of the data line 171. In the present exemplary embodiment, the first longitudinal portion of the data line 171 is disposed on the left side of the overlapping portions RG, GB, and BR of the color filters, and the second longitudinal portion of the data line 171 is disposed on the right side of the overlapping portions RG, GB, and BR of the color filters. Alternative exemplary embodiments include configurations wherein the positioning of the first and second portions of the data line 171 may be reversed. Accordingly, the data lines 171 are located away from the overlapping portions RG, GB, and BR of the color filters such that the increase of the step coverage of the overlapping portions of the color filters may be prevented, thereby forming a more uniform cell gap.

A passivation layer 180 is formed on the color filters 230.

The passivation layer 180, the color filters 230, and the sealing layer 160 have a plurality of contact holes 185a and 185b and contact holes 182 respectively exposing the first and second drain electrodes 175a and 175b and the end portions 179 of the data lines 171. Also, the passivation layer 180, the sealing layer 160, and the gate insulating layer 140 have a plurality of contact holes 181 exposing the end portions 129 of the gate lines 121.

A plurality of pixel electrodes 191 and a plurality of contact assistants 81a, 81b, and 82 are formed on the passivation layer 180.

Each pixel electrode 191 includes a pair of first and second sub-pixel electrodes 191a and 191b that are separated from each other. A pair of a first sub-pixel electrode 191a and a second sub-pixel electrode 191b is disposed with a gap 91 therebetween.

In the present exemplary embodiment, the first sub-pixel electrode 191a has an isosceles trapezoid shape having bottom edges substantially parallel to the data line 171 and including a trapezoidal cut-out from the bottom edge thereof, and most of the first sub-pixel electrode 191a is surrounded by the second sub-pixel electrode 191b. The second sub-pixel electrode 191b includes upper, lower, and central trapezoid portions of which the leftmost edges are connected to each other.

The second sub-pixel electrode 191b includes cutouts 93a and 94a that extend from the upper edge of the upper trapezoid portion toward the right edge, and 93b and 94b that extend from the lower edge of the lower trapezoid portion toward the right edge. The central trapezoid portion of the second sub-pixel electrode 191b is inserted in the trapezoidal cut-out of the first sub-pixel electrode 191a.

Gaps 91, 92a, and 92b between the first sub-pixel electrode 191a and the second sub-pixel electrode 191b include two pairs of upper oblique portions and lower oblique portions forming an angle of about 45 degrees with respect to the first and the second gate lines 121a and 121b, and a longitudinal portion, wherein the longitudinal portion traverses the storage electrode line 131.

Hereafter, for better comprehension and ease of description, the gaps 91, 92a, and 92b are described as cutouts. The cutouts 91-94b have substantially an inverse symmetric structure with respect to the storage electrode line 131, they form an angle of about 45 degrees with respect to the first and second gate lines 121a and 121b, and the cutouts 92a, 93a, and 94a extend perpendicularly to the cutouts 92b, 93b, and 94b. In the present exemplary embodiment, the pixel electrode 191 is divided into a plurality of regions by the cutouts 91-94b.

Here, the number of regions or cutouts may vary depending on design components, such as the size of the pixel electrode 191, the length ratio of the horizontal side and the vertical side of the pixel electrode 191, the type of liquid crystal layer 3, or other characteristics of the display.

The first and second sub-pixel electrodes 191a and 191b are respectively connected to the first and second drain electrodes 175a and 175b through the contact holes 185a and 185b, and receive data voltages from the first and second drain electrodes 175a and 175b. The pair of sub-pixel electrodes 191a and 191b are applied with separate predetermined data voltages with respect to one frame, and the magnitude thereof may be determined according to the size and shape of the sub-pixel electrodes 191a and 191b. Also, the areas of the sub-pixel electrodes 191a and 191b may be different from each other, for example the first sub-pixel electrode 191a may be applied with high voltage compared with the second sub-pixel electrode 191b and the area thereof may be smaller than the area of the second sub-pixel electrode 191b.

In the exemplary embodiments where present, the contact assistants 81a, 81b, and 82 are respectively connected to the end portions 129a, 129b, and 179 of the first and second gate lines 121a and 121b and the end portions 179 of the data lines 171 through the contact holes 181a, 181b, and 182.

In the present exemplary embodiment, similar to the above-described exemplary embodiment, the pixel electrode 191 asymmetrically overlaps the data lines 171 disposed on both sides thereof. That is to say, one side of the pixel electrode 191 overlaps the first longitudinal portion of the data line 171 and the other side of the pixel electrode 191 overlaps the second longitudinal portion of the data line 171. Here, the first and second longitudinal portions 171a and 171b of the data line 171 may prevent light leakage from being generated due to an inclination formed in the portion where the neighboring color filters overlap each other.

Also, the plurality of first light-blocking members 122 are formed on the portions where the first and second longitudinal portions 171a and 171b of the data lines 171 are not disposed near the edges of the pixel electrodes 191 such that the light leakage that may be generated by the inclination formed on the overlapping portion of the color filter is prevented. In the present exemplary embodiment, the first light-blocking members 122 partially overlap the edges of the pixel electrodes 191, and the portions that are not overlapped with the pixel electrodes 191 may be protruded from the ends of the pixel electrodes 191 by about 1 µm to about 5 µm. In one exemplary embodiment, the portions that are not overlapped with the pixel electrodes 191 may be protruded from the ends of the pixel electrodes 191 by about 2 µm.

Next, the common electrode panel 200 will be described.

A plurality of third light-blocking members 220 is formed on an insulating substrate 210. The third light-blocking member 220 may include a linear portion 220a extended in the substantially longitudinal direction and a protrusion 220b corresponding to the TFT. In one exemplary embodiment, the width of the linear portion 220a of the third light-blocking member 220 may be equal to or wider than the sum of the width of the data line 171, the width of the overlapping portion of the color filters, and the width of the first light-blocking member 122, and the protrusion 220b is disposed corresponding to the TFT.

Referring to FIGS. 2 and 4, the width of the third light-blocking member 220 may be equal to or wider than the sum of the distance p from the end of the data line 171 overlapped with the pixel electrode 191 to the end of the pixel electrode 191, the interval q between the neighboring pixel electrodes 191, and the overlapping width r between the first light-blocking member 122 and the pixel electrode 191. Here, the distance p from the end of the data line 171 overlapped with the pixel electrode 191 to the end of the pixel electrode 191 includes the width $p_1$ of the data line 171 and the process margin $p_2$.

An overcoat 250 is formed on the third light-blocking member 220, and a common electrode 270 is formed thereon.

In the present exemplary embodiment, the common electrode 270 includes a plurality of cutouts 71, 72, 73a, 73b, 74a, 74b, 75a and 75b. One set of the cutouts 71-75b is disposed opposite to one pixel electrode 191 and includes central cutouts 71 and 72, upper oblique cutouts 73a and 74a, lower oblique cutouts 73b and 74b, and corner cutouts 75a and 75b. In the present exemplary embodiment, central cutouts 71 and 72 are disposed between the gaps 91, 92a, and 92b of the first and second sub-pixel electrodes 191a and 191b, the upper oblique cutouts 73a and 74a are disposed between the cutout 92a, 93a, and 94a of the first and second sub-pixel electrodes 191a and 191b, and the lower oblique cutouts 73b and 74b are disposed between the cutouts 92b, 93b, and 94b of the first and second sub-pixel electrodes 191a and 191b. The corner cutouts 75a and 75b are disposed on the chamfered portion of the second sub-pixel electrode 191b. One or ordinary skill in the art would appreciate that the number and direction of the cutout 71-75b may be changed according to design elements.

Alignment layers 11 and 21 are coated on the inside surfaces of the display panels 100 and 200, and, in one exemplary embodiment, may be vertical alignment layers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a first substrate;
a gate electrode disposed on the first substrate;
a first pixel electrode disposed on the first substrate;
a second pixel electrode disposed on the first substrate and neighboring the first pixel electrode;
a first color filter disposed under the first pixel electrode;
a second color filter disposed under the second pixel electrode and overlapping the first color filter in an area between the first pixel electrode and the second pixel electrode, and the first and second color filters disposed between the first substrate and the first and second pixel electrodes;
a data line including a first portion and a second portion respectively disposed on left and right sides of the area wherein the first color filter and second color filter overlap; and
a first light-blocking member disposed substantially opposite to one of the first portions of the data line and the second portion of the data line with respect to the area wherein the first and second color filter layers overlap,
wherein the data line is disposed on a first area away from the area wherein the first color filter and the second color filter overlap, and
wherein the first light-blocking member is disposed on a second area away from the area wherein the first and second color filter layers overlap, and partially overlaps a portion of an edge of the first pixel electrode and the second pixel electrode and is disposed on a same layer where the gate electrode is located, and
wherein the first area does not overlap the second area.

2. The display device of claim 1, wherein
the first portion of the data line overlaps the first pixel electrode, and the second portion overlaps the second pixel electrode.

3. The display device of claim 2, wherein
the entire width of the first portion of the data line overlaps the first pixel electrode, and the entire width of the second portion overlaps the second pixel electrode.

4. The display device of claim 3, wherein
the first portion and the second portion of the data line are alternately disposed.

5. The display device of claim 4, wherein
the area of the first portion of the data line overlapping the first pixel electrode is substantially the same area as the area of the second portion of the data line overlapping the second pixel electrode.

6. The display device of claim 4, wherein:
the first portion and the second portion of the data line respectively extend in a first direction, and
the data line further includes a third portion connecting the first portion and the second portion.

7. The display device of claim 1, wherein
the first light-blocking member overlaps at least one of an edge of the first pixel electrode and the second pixel electrode, and being disposed substantially parallel to one of the first portion and the second portion of the data line.

8. The display device of claim 7, further comprising:
a semiconductor disposed under the data line and having substantially the same planar shape as the data line, and
a second light-blocking member disposed under the semiconductor.

9. The display device of claim 7, further comprising:
a second substrate disposed facing the first substrate;
a third light-blocking member disposed on the second substrate;
a common electrode disposed on the third light-blocking member; and
a liquid crystal layer disposed between the first substrate and the second substrate,
wherein a width of the third light-blocking member is substantially equal to or larger than the sum of a width of the data line, an interval between the first pixel electrode and the second pixel electrode, and a width corresponding to an area of overlap between the first light-blocking member and one of the first pixel electrode and the second pixel electrode.

10. A display device comprising:
a first substrate;
a gate electrode disposed on the first substrate;
a first pixel electrode disposed on the first substrate;
a second pixel electrode disposed on the first substrate and neighboring the first pixel electrode;
a data line including a first portion and a second portion respectively disposed on opposite sides of the first and second pixel electrodes with respect to an imaginary straight line passing between the first pixel electrode and the second pixel electrode, and a third portion connecting the first and second portions to each other;
a first color filter disposed under the first pixel electrode;
a second color filter disposed under the second pixel electrode; and
a first light-blocking member disposed substantially opposite to one of the first portions of the data line and the second portion of the data line with respect to the area wherein the first and second color filter layers overlap,
wherein the first and second color filters are disposed between the first substrate and the first and second pixel electrodes, and
wherein the entire width of the first portion of the data line overlaps the first pixel electrode and the entire width of the second portion of the data line overlaps the second pixel electrode, and
wherein the data line is disposed on a first area away from the area wherein the first color filter and the second color filter overlap, and
wherein the first light-blocking member is disposed on a second area away from the area wherein the first and second color filter layers overlap, and overlaps a portion of an edge of the first pixel electrode and the second pixel electrode and is disposed on a same layer where the gate electrode is located, and wherein the first area does not overlap the second area.

11. The display device of claim 10, wherein the first color filter and the second color filter overlap each other in an area between the first pixel electrode and the second pixel electrode.

12. The display device of claim 11, wherein the first portion and the second portion of the data line are disposed away from the area wherein the first color filter and the second color filter overlap.

13. The display device of claim 12, wherein the first portion of the data line is disposed between two second portions of the data line.

14. The display device of claim 13, wherein the areas of the first portion and the second portion of the data line are substantially the same.

15. The display device of claim 10, wherein the first light-blocking member partially overlaps an edge of one of the first and second pixel electrodes and disposed substantially parallel to one of the first and second portions of the data line.

16. The display device of claim 15, further comprising:

a semiconductor disposed under the data line and having substantially the same planar shape as the data line; and a second light-blocking member disposed under the semiconductor.

17. The display device of claim 10, further comprising:

a second substrate disposed facing the first substrate;

a third light-blocking member disposed on the second substrate;

a common electrode disposed on the third light-blocking member, and a liquid crystal layer interposed between the first substrate and the second substrate, wherein the width of the third light-blocking member is substantially equal to or larger than a sum of a width of the data line, an interval between the first pixel electrode and the second pixel electrode, and a width corresponding to an area of overlap between the first light-blocking member and one of the first pixel electrode and the second pixel electrode.

18. The display device of claim 1, wherein the first light-blocking member is disposed under the first and second color filter layers.

19. The display device of claim 10, wherein the first light-blocking member is disposed under the first and second color filter layers.

* * * * *